A. SIMON.
WATCH CHARM.
APPLICATION FILED MAY 26, 1910.
993,801.
Patented May 30, 1911.
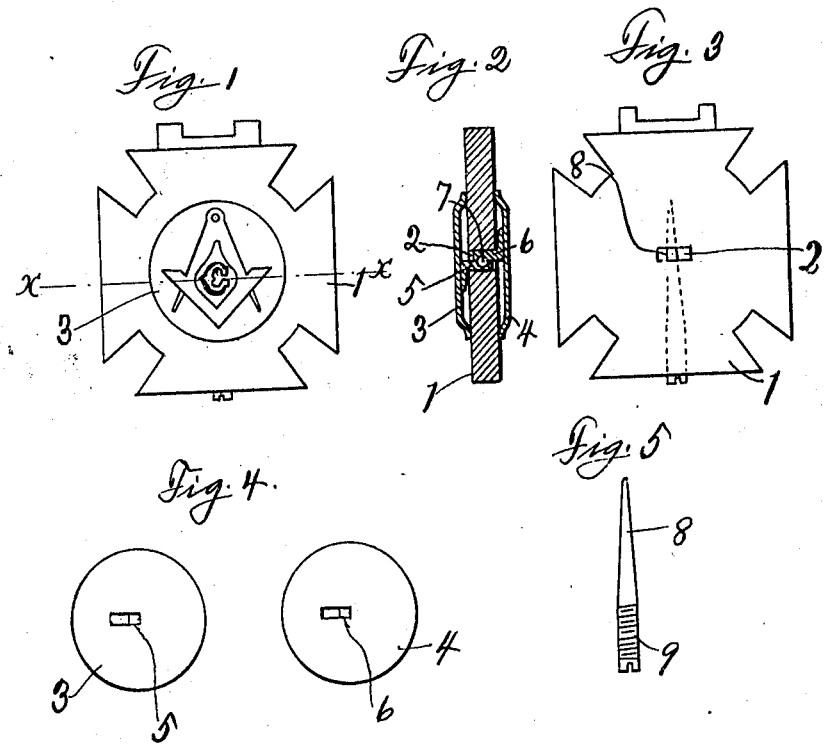
Witnesses
Inventor
Arthur Simon.
By A. L. Jackson
Attorney

UNITED STATES PATENT OFFICE.

ARTHUR SIMON, OF FORT WORTH, TEXAS, ASSIGNOR, BY MESNE ASSIGNMENTS, OF ONE-HALF TO ISAAC BLACKMAN, OF FORT WORTH, TEXAS.

WATCH-CHARM.

993,801.   Specification of Letters Patent.   Patented May 30, 1911.

Application filed May 26, 1910. Serial No. 563,599.

*To all whom it may concern:*

Be it known that I, ARTHUR SIMON, a citizen of the United States, residing at Fort Worth, in the county of Tarrant and State of Texas, have invented certain new and useful Improvements in Watch-Charms, of which the following is a specification.

My invention relates to charms or badges or other ornamental devices, and the object is to provide a charm or badge with interchangeable emblems, and the advantage is that it will not be necessary to prepare or make an entirely new charm or badge when a party wants a different emblem from any on the market.

Other objects and advantages will be fully explained in the following description and the invention will be more particularly pointed out in the claims.

Reference is had to the accompanying drawings which form a part of this application and specification:

Figure 1 is a face view of a charm with an emblem mounted thereon. Fig. 2 is a diametrical section of two emblems mounted on a charm. Fig. 3 is a face view of a charm taken on the line *x—x* of Fig. 1 with the emblem removed, showing the manner of retaining the emblems in place. Fig. 4 is a rear view of the two emblems. Fig. 5 is a view of the screw pin which retains the emblems in place.

Similar characters of reference are used to indicate the same parts throughout the several views.

The charm 1 may be of any suitable design. An opening 2 is made in the central portion of the charm to receive the shanks of different emblems. Emblems 3 and 4 have shanks 5 and 6 which enter the opening 2. The shanks extend from the central portions of the rear faces of the emblems at right angles thereto and when two emblems are mounted on the charm, the two shanks will pass each other, the surfaces of the adjacent parts of the shank being against each other. An opening 7 is made between the adjacent surfaces of the shanks to receive a retaining pin 8. The pin 8 has a threaded portion 9 to be screwed into the charm. The two emblems will be held securely in place by the pin 8. The emblems may be prepared with any desirable design and replaced as often as desirable. There can be an emblem of one fraternity on one side and an emblem of a different fraternity on the other side of the charm.

Having fully described my invention, what I claim as new and desire to secure by Letters Patent, is,—

1. A charm having a body provided with an opening therethrough, detachable emblems mounted on opposite sides of said body and having shanks projected into said opening, and a pin in said body engaging both shanks, each shank coöperating with said pin to prevent removal of the other shank.

2. A charm having a body provided with an opening therethrough, detachable emblems mounted on opposite sides of said body and having shanks projected into said opening, said shanks coming against each other in said opening and having an opening formed in them between their overlapping surfaces, and a pin passing through the latter opening to hold said emblems on said body.

3. A charm having a body provided with an opening therethrough, detachable emblems mounted on opposite sides of said body, each emblem having a shank off-set relative to the center of its inner face and said shanks being inserted in said opening against each other and having an opening formed in them between their overlapping surfaces, and a pin passing through the latter opening to hold said emblems on said body.

In testimony whereof, I set my hand in the presence of two witnesses, this 23rd day of May, 1910.

ARTHUR SIMON.

Witnesses:
A. L. JACKSON,
J. W. STITT.

---

Copies of this patent may be obtained for five cents each, by addressing the "Commissioner of Patents. Washington, D. C."